United States Patent

Lynes et al.

[15] 3,699,541

[45] Oct. 17, 1972

[54] TWO-TERMINAL TRANSISTOR MEMORY UTILIZING EMITTER-BASE AVALANCHE BREAKDOWN

[72] Inventors: Dennis Joseph Lynes, Madison; Jerry Mar, Scotch Plains, both of N.J.

[73] Assignee: Bell Telephone Laboratories, Incorporated, Murray Hill, N.J.

[22] Filed: Dec. 31, 1970

[21] Appl. No.: 103,167

[52] U.S. Cl................340/173 R, 307/238, 307/280, 307/283

[51] Int. Cl...........................................G11c 11/40

[58] Field of Search...340/173 R; 307/238, 280, 283, 307/300, 302

[56] References Cited

UNITED STATES PATENTS 2,991,374 7/1961 De Miranda et al...307/300 X 3,001,089 9/1961 Tulp......................307/280 X 3,373,295 3/1968 Lambert.............340/173 CA

*Primary Examiner*—Malcolm A. Morrison

*Assistant Examiner*—David H. Malzahn

*Attorney*—R. J. Guenther and Arthur J. Torsiglieri

[57] ABSTRACT

A semiconductor memory cell containing a single transistor having an uncontacted base is operated as a two-terminal device with a voltage pulse circuit coupled to the collector and a conduction detector circuit coupled to the emitter. Bit information is written into the cell by setting the potential of the base to one of two values, which represent respectively a "1" and a "0." A "1" is written into the cell by applying a negative polarity voltage pulse to the collector of sufficient amplitude to forward bias the collector-base junction and to bias the emitter-base junction to avalanche breakdown. To read out information previously stored in the cell and to write a "0" into the cell, a positive going voltage pulse is applied to the collector.

14 Claims, 3 Drawing Figures

INVENTORS D. J. LYNES
J. MAR
BY
ATTORNEY

TWO-TERMINAL TRANSISTOR MEMORY UTILIZING EMITTER-BASE AVALANCHE BREAKDOWN

BACKGROUND OF THE INVENTION

1. Field of the Invention

This invention relates to semiconductor memory apparatus which utilizes a single two-terminal transistor as a component of large information capacity semiconductor memories.

2. Description of the Prior Art

In computers and related applications there exists a need for large information capacity semiconductor memories in which information can be temporarily stored and read out within a useful period of time. To meet such requirements, it is necessary that the basic memory cell be of a sufficiently simple structure to permit a relatively large number to be fabricated and interconnected on a single monolithic integrated circuit chip.

To this end, prior art memory cells have used charge storage diodes for retaining information bits. One serious disadvantage of such memory cells is that the maximum storage time is limited to the minority carrier lifetime of the diodes used. Another disadvantage is that, as the physical size of the diodes and the amount of write current decreases, the magnitude of the stored charge which serves as the output signal decreases, thereby necessitating sensitive amplifiers to detect the small current differences between a stored "1" and "0."

In copending application of S. G. Waaben Ser. No. 864,705, filed Oct. 8, 1969, now U.S. Pat. No. 3,626,389, in which there is a common assignee to this invention, the storage time has been extended through the use of two serially connected diodes which have different minority carrier lifetimes.

In copending application of M. Feldman and G. L. Heiter, Ser. No. 46,646, filed June 16, 1970 a light activated memory cell is described which utilizes a single transistor having an uncontacted photosensitive base. Signal light received over a period of time on the photosensitive base causes a build up of charge on the base which flows into the emitter-base junction when the transistor is turned on and gives rise to a collector current that is beta times the light signal created base current. This amplification of the output signal is very desirable; however, in many applications it is not practical to use any other input signal than an electrical one that is physically connected to the cell.

One solution to this problem is the use of a transistor having a contacted base, collector, and emitter. This solution works well for a single cell but is impractical to implement in a large memory because the making of three electrical contacts to each memory cell unduly increases the size of the integrated circuit chip and the complexity of the fabrication process.

The foregoing makes it clear that it is desirable to provide a practical two-terminal memory cell having transistor amplication of the signal, a storage time longer than the minority carrier lifetime and an electrical input wired to the cell, but to date no such device has been built.

OBJECTS OF THE INVENTION

It is an object of this invention to provide a semiconductor memory cell with increased storage time.

It is another object of this invention to provide a memory cell capable of use over wide voltage margins.

It is still another object of this invention to provide a memory cell having a high degree of detection sensitivity between a "1" and a "0."

It is a further object of this invention to provide a two-terminal memory cell which meets the above-mentioned objectives, is easily fabricated using standard integrated circuit techniques, and consists of only a single transistor.

It is a still further object of this invention to provide a relatively large capacity semiconductor memory using interconnected memory cells each meeting the above-mentioned objectives.

SUMMARY OF THE INVENTION

These and other objects of the invention are attained in an illustrative embodiment thereof comprising a memory cell consisting of only a single transistor containing a collector coupled to a voltage pulse circuit, an emitter coupled to a conduction detector circuit, and an uncontacted base whose floating potential is set to one of two values, which represent respectively a stored "1" and "0."

A "1" is written into the cell by sufficiently negatively pulsing the collector potential to forward bias the collector-base junction and to bias the emitter-base junction to avalanche breakdown. The useful storage time of information written into the cell is determined by the leakage of charge from the base into the relatively high impedances of reversed biased semiconductor junctions. To read out information previously stored within the cell and write a "0" into the cell a positive polarity voltage pulse is applied to the collector.

The simplicity of the structure of this memory cell, the two-terminal operation, the relatively long retention period of stored information, and the ease of fabrication using standard integrated circuit techniques make this memory cell well suited for use in large capacity integrated circuit memories.

These and other objects, features, and advantages of this invention will be better understood from a consideration of the following detailed description, taken in conjunction with the accompanying drawings.

DETAILED DESCRIPTION

Figure 1:
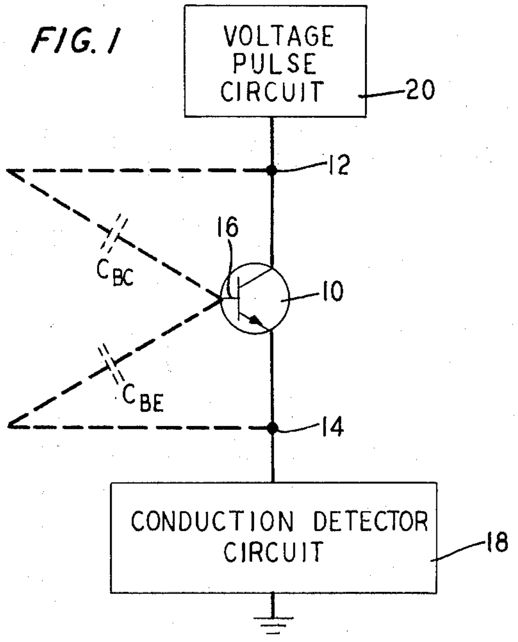
FIG. 1 illustrates a schematic diagram of a two-terminal NPN transistor memory cell in accordance with this invention.

Referring now to FIG. 1, there is shown an illustrative embodiment of the invention comprising an NPN transistor 10 containing a collector terminal 12, emitter terminal 14, and an uncontacted base 16. A circuit 18 is connected to the emitter terminal 14 which acts as a conduction detector and a low impedance path to ground potential. A voltage pulse circuit 20 is connected to the collector terminal 12. The capacitances $C_{BC}$ and $C_{BE}$ associated with the collector-base junction and the base-emitter junction, respectively, are shown external to the transistor in order to simplify the description of the mode of operation which appears below. These capacitances serve as a low impedance ac path between the collector, base, and emitter.

The potential of the base 16 floats and is electrically set to one of two values, which represent respectively the storage of a "1" and "0" in the cell, by applying appropriate polarity voltage pulses to the collector terminal 12.

A "1" is stored in a cell containing a "0" by applying to the collector terminal 12, a negative polarity write voltage pulse of more than sufficient amplitude to bias the emitter-base junction to avalanche breakdown and to forward-bias the collector-base junction.

The broken down emitter-base junction is a low impedance path. Current flows from ground through the series combination of the conduction detector, broken down emitter-base junction, and forward-biased collector-base junction into the voltage pulse circuit. At this point the base potential is more negative than the "0" base potential. The termination of the write pulse first causes the base and emitter potentials to rise until there is insufficient reverse-bias across the emitter-base junction to allow avalanche breakdown operation. At this point current ceases to flow and the base potential increases as a function of capacitive voltage division between $C_{BC}$ and $C_{BE}$. The base potential increases to a value more positive than the "0" potential. This value is defined as the "1" potential.

In order to detect information stored in the cell, a positive polarity read voltage pulse is applied to the collector by the voltage pulse circuit. If a "1" is stored in the cell, the base potential rises and attains a value such that the emitter-base junction is forward-biased and transient conduction occurs. If a "0" is stored in the cell, the base potential rises but fails to attain a value sufficient to allow transistor conduction. At the termination of the read pulse the base assumes the "0" potential.

In operation, to write a "1" on a base containing a "0," an approximately ground based write voltage pulse having a negative polarity is applied to the collector terminal 12 by the voltage pulse circuit 20. The leading edge of the write pulse causes the collector-base junction to be forward-biased and the base potential to decrease with respect to the emitter potential such that the emitter-base junction is biased to avalanche breakdown limiting any further decrease in base potential with respect to emitter potential.

Current flows from ground through the series combination of the conduction detector, broken down emitter-base junction, and forward-biased collector-base junction into the voltage pulse circuit. This is opposite to the flow of collector current through a transistor.

The trailing edge of the write pulse first increases the base and emitter potential until avalanche breakdown ceases and then raises the base potential to a potential more positive than the "0" potential. This resulting base potential is defined as the "1" potential.

Another factor which causes "1" base potential to be a more positive value than indicated above is the presence of holes within the transistor which, upon the termination of current flow through the transistor, flow into the base and raise its potential.

The rapid termination of current flow through the forward-biased collector-base junction causes holes to be temporarily trapped within the junction. This is commonly known as minority carrier storage. These holes, in order to exit the transistor, must recombine with electrons and then exit the transistor via the collector terminal into the voltage pulse circuit. Some number of holes are able to exit the transistor due to leakage. The effective lifetime of these trapped holes is a function of the recombination and leakage rates.

In order to take advantage of the effect of these holes, it is necessary for the fall time of the trailing edge of the write pulse to be equal to or less than the effective lifetime of the holes. In a preferred embodiment, the effective lifetime of the holes is approximately 50 nanoseconds and the fall time of the trailing edge of the write pulse is approximately 10 nanoseconds.

In order to detect the base potential and thereby determine the stored information in the cell, an approximately ground based read voltage pulse of positive polarity is applied to the collector terminal by the voltage pulse circuit. The amplitude of this pulse is insufficient to bias the collector-base junction to avalanche breakdown. The leading edge of the read pulse causes the base potential to rise sufficiently with respect to the emitter terminal potential to forward-bias the emitter-base junction sufficiently to allow transistor conduction if, and only if, the base was previously at the "1" potential. Transient transistor conduction upon the application of a read pulse to the memory cell is interpreted as a "1," whereas nontransistor conduction is interpreted as a "0."

The pulse width of the read pulse is such that transient transistor conduction, which occurs if the cell was previously at the "1" potential, ceases prior to the start of the trailing edge of the read pulse. Upon termination of the transient transistor conduction, the emitter-base junction is left forward-biased, but not sufficiently so to permit conduction. The trailing edge of the read pulse then lowers the base potential to the "0" potential. Therefore, the reading out of a stored "1" from the cell causes the writing of a "0" into the cell.

If a read pulse is applied to a memory cell containing a stored "0" the leading edge of the pulse raises the base potential with respect to the emitter potential sufficiently to forward-bias the emitter-bias junction, but not sufficiently to allow transistor conduction. The trailing edge of the read pulse then lowers the base potential back to the "0" potential. It is, therefore, apparent that the reading out of a stored "1" or "0" from the cell causes the writing of a "0" into the cell.

If a read pulse is applied to a memory cell that contains a stored "0," some current flow due to the voltage change across the series combination of $C_{BC}$ and $C_{BE}$ is detected by the conduction detector circuit. The transistor does not conduct because the base potential does not become positive enough to cause the emitter-base junction to be sufficiently forward-biased to permit conduction. If $C_{BC} = C_{BE}$, then the induced current through them is directly proportional to $C_{BC}/2$. This current is the output signal which represents a stored "0."

If a read pulse is applied to a memory cell that contains a stored "1," an initial current identical to that corresponding to a stored "0" will be detected. In response to the read pulse the base potential rapidly increases so as to forward-bias the emitter-base junction. The forward-biased emitter-base junction acts is a low impedance shunt across $C_{BE}$ which limits any further change in potential across $C_{BE}$. The current now induced in $C_{BC}$ is directly proportional to $C_{BC}$, and not to $C_{BC}/2$, as is the case for a stored "0." This induced current in $C_{BC}$ flows into the low impedance emitter-base junction, is amplified by a factor of $\beta+1$ and is detected by the conduction detector voltage control circuit that is connected to the emitter. This current is the output signal which represents a stored "1."

The current detected for a stored "1" is, therefore, proportional to $C_{BC}$ $(\beta+1)$, as compared to a "0" current proportional only to $C_{BC}/2$. This means that the ratio of the output signal for a "1" to a "0" is approximately $2(\beta+1)$:1. A $\beta$ of even 9 results in a 20:1 difference between a "1" and a "0" output signal.

If $C_{BC}$ is greater than $C_{BE}$, as is the case in many integrated circuit transistors, the current signal representative of a stored "0" is primarily determined by $C_{BE}$ while the current representative of a "1" level is primarily determined by $C_{BC}$ and if $C_{BC} = 10\ C_{BE}$, the ratio of a "1" signal to "0" signal is $10(\beta+1)$:1. For a $\beta$ of 9 this means a ratio of 100:1. Even if $C_{BC}$ is smaller than $C_{BE}$, there will still be a relatively large difference between the "1" and "0" output currents due to the $\beta+1$ multiplication of the base current.

In a preferred embodiment of the invention, an NPN transistor having an uncontacted base is utilized as a two terminal memory cell. The collector-base junction has a breakdown potential of 11 volts. The emitter-base junction has a breakdown potential of 6.5 volts. A ground based negative polarity voltage pulse having an amplitude of 9 volts is used as the write pulse. A ground based positive polarity voltage pulse having an amplitude of 9 volts is used as the read pulse. The "0" base potential is approximately −4.1 volts and the "1" base potential is approximately 0 volts. This 4.1 volt difference between a "1" and "0" compares favorably with presently used DTL and $T^2L$ bipolar memory cells.

Relatively large variations in pulse supply voltages can be tolerated with little effect on circuit performance. For example, a negative polarity write pulse having an amplitude of greater than 9 volts can be used with little detrimental effect to the value of the "1" base potential.

Relatively wide variations in the amplitude of the read pulse are possible without any serious detrimental effect to circuit operation. A read voltage pulse whose amplitude is greater than 9 volts, but less than 11 volts; causes the "0" base potential to be more negative than −4.1 volts; an amplitude of less than 9 volts, but more than 3 volts, causes the "0" potential to be more positive than −4.1 volts but less positive than 0 volts, the "1" potential.

In another embodiment of the invention an NPN transistor having an uncontacted base and equal avalanche breakdown potentials of 6.5 for the collector-base junction and the emitter-base junction is utilized as a two terminal memory cell. A ground based negative polarity voltage pulse having an amplitude of 6 volts is used as the write pulse. A ground based positive polarity voltage pulse having an amplitude of 6 volts is used as the read pulse. The "0" base potential is approximately −4.7 volts and the "1" base potential is approximately 0 volts.

A major advantage of this embodiment is that the emitter-base junction operates only momentarily in avalanche breakdown. This means that there is almost no current flowing through the collector-base junction and therefore there is negligible minority carrier storage. Therefore, there is no restriction on the fall time of the trailing edge of the write pulse.

As has been illustrated, the read operation causes a "0" to be stored in the cell. At the termination of the read operation the collector and emitter are at approximately ground potential and the base potential is approximately −4.1 volts, the "0" potential. The collector-base and emitter-base junctions are therefore reverse-biased and represent high impedance paths to charge stored on the base. If these reverse-bias junctions were of infinitely high impedance, the charge stored in the base, which causes the base potential to be at −4.1 volts, would remain in the base forever, and therefore the information stored in the cell could be read out at any later time. The impedances associated with the reverse-biased junctions, however, do not have infinitely high impedance and therefore charge stored on the base will leak off into these reverse-biased junctions and the base potential will reach the same potential as the collector and emitter, 0 volts. If a stored "0" is not detected before the charge leaks from the base and raises the base potential to 0 volts, a "1" will be detected instead of a "0" since a "1"base potential corresponds to a base potential of 0 volts. Stored "1's" are never destroyed unless intentionally removed from the cell.

By using air insulated integrated circuit techniques it is possible to construct a single memory cell, including wiring in just one millionth of a square inch. One thousand and twenty-four memory cells can be fabricated and interconnected on a single integrated circuit chip having an area of approximately 0.1 square inch.

Figure 2:
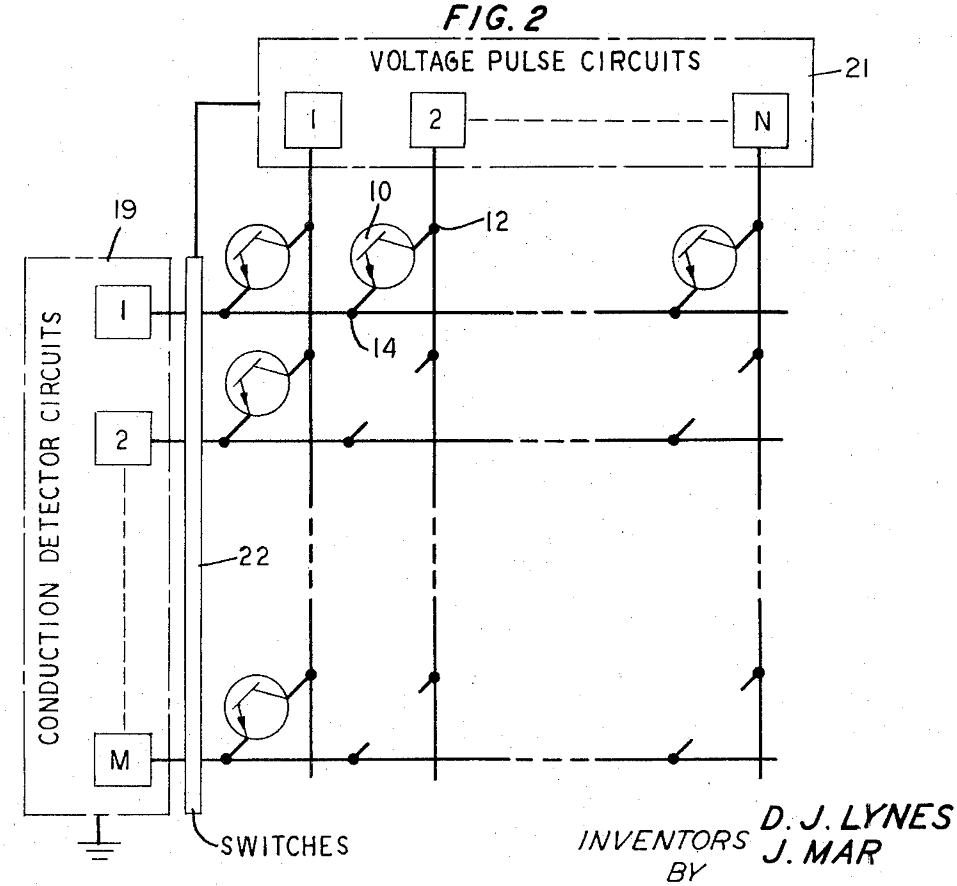
FIG. 2 illustrates a memory system formed using the NPN transistor memory cell of FIG. 1.

Referring now to FIG. 2 there is shown another illustrative embodiment of the invention comprising an array of NPN transistors 10 forming a bit organized memory. The array is arranged in M rows N columns of NPN individual transistors which are interconnected to form a memory having M×N memory cells. All of the collector terminals 12 in a common column are interconnected; all of the emitter terminals 14 in a common row are interconnected. Voltage pulse circuits 21 are electrically connected to the common collector terminals 12. Circuits 19, which act as the conduction detectors and low impedance paths to ground potential, are electrically connected to the common emitter terminals 14 through switches 22. In operation this multicell memory is similar to that of the single memory cell of FIG. 1.

In operation, to write a "1" into a preselected cell an approximately ground based negative going write voltage pulse is applied to the column in which the cell is connected. All other columns are held at ground potential. The switch corresponding to the row connected to the preselected cell is closed; all other switches are left open.

In order to read out information stored in a preselected cell and write a "0" into the cell, the same procedure for writing a "1" is followed except that a voltage pulse of opposite polarity to that of the write voltage pulse is used.

The above-mentioned write and read operations allow information to be written into or read out of a preselected cell without destroying information stored in all other cells of the memory array. This feature allows the memory to be used as a bit organized memory.

Figure 3:
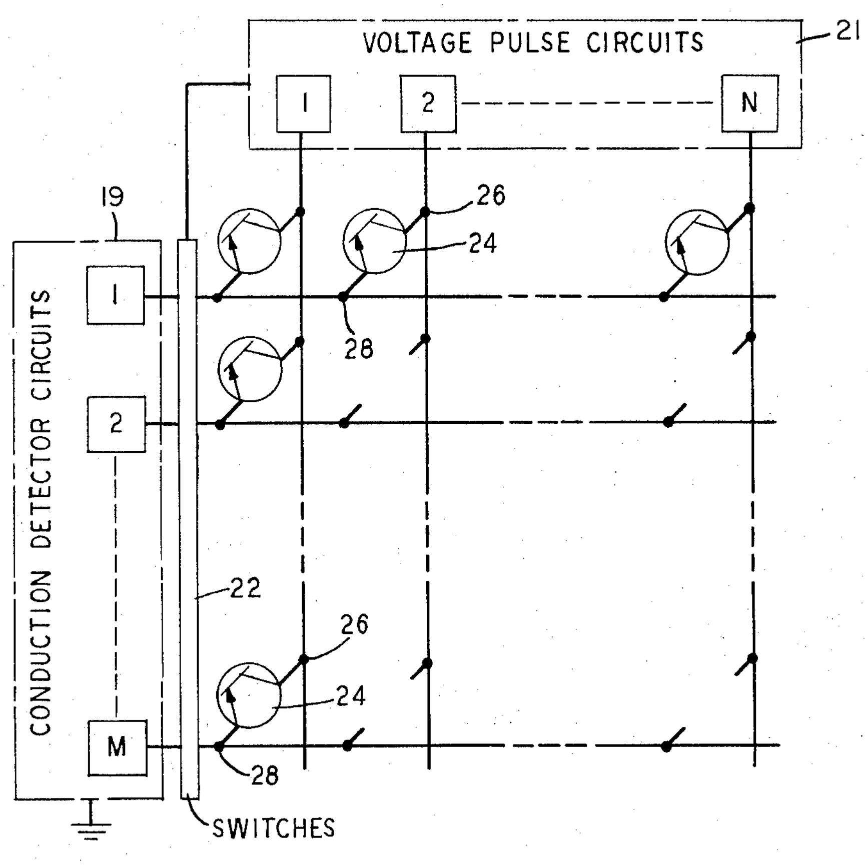
FIG. 3 illustrates another memory system formed using PNP transistor memory cells.

Referring now to FIG. 3 there is shown another illustrative embodiment of the invention comprising an array of PNP transistors 24 forming a bit organized memory. The array is arranged in M rows and N columns of individual PNP transistors which are interconnected to form a memory having M×N memory cells. All of the collector terminals 26 in a common column are interconnected; all of the emitter terminals 28 in a common row are interconnected. Voltage pulse circuits 21 are electrically connected to the common collector terminals 26. Circuits 19, which act as conduction detectors and a low impedance path to ground potential, are electrically connected to the common emitter terminals 28 through switches 22.

The operation of this memory is the same as that of the memory of FIG. 2 except that the polarities of the read and write voltage pulse must be reversed. The resulting "0" base potential is more positive than the "1" base potential. Electrons, which are temporarily trapped within the transistor following the termination of current flow through the forward-biased collector-base junction, flow into the base and cause the base to assume the "1" potential.

The embodiments described are intended to be illustrative of the principles of the invention. Various other modifications and embodiments may be made by those skilled in the art without departing from the spirit and scope of the invention. For example, the bit organized memory can be easily converted into a word organized memory.

We claim:

1. A semiconductor memory cell comprising:

a junction transistor having an uncontacted base, the potential of which floats at two values which represent, respectively, a "1" and "0" stored in the cell;

first means coupled to the transistor for forward biasing the collector-base junction and biasing the emitter-base junction to avalanche breakdown to set the potential of the base to a first value which is defined as a "1," and second means coupled to the transistor for first increasing and then decreasing the potential of the collector such that the potential of the base is set to a second value which is defined as a "0," and conduction occurs within the transistor if, and only if the base was initially at the "1" potential.

2. A semiconductor memory cell comprising:

a junction transistor having an uncontacted base, the potential of which floats at two values which represent, respectively, a "1" and "0" stored in the cell;

a first circuit means coupled to the collector of said transistor for first decreasing the potential of the collector of said transistor from an initial value to a value that causes the collector-base junction to be forward-biased and the base potential to start to decrease in potential toward a potential greater than that necessary to bias the emitter-base junction to avalanche breakdown, thereby causing the emitter-base junction to operate in avalanche breakdown and preventing the base potential from decreasing further, and then increasing the potential of the collector to its initial value, whereupon the base potential returns to a different potential than the "0" potential, said different potential being the "1" potential; and a second circuit means coupled to the collector first increasing the collector potential from an initial value sufficient to cause transient transistor conduction only if a "1" is stored in the cell, and then decreasing the potential of the collector to its initial value, whereupon the base potential assumes the "0" potential.

3. The memory cell of claim 2 wherein said first and second means constitute part of a voltage pulse circuit adapted to supply voltage pulses of different amplitudes.

4. The memory cell of claim 2 further comprising a conduction detector circuit coupled to the emitter of the transistor.

5. The memory cell of claim 4 wherein the conduction detector circuit is coupled to a reference ground potential.

6. The memory cell of claim 5 wherein said conduction detector circuit is a low impedance connecting said emitter to said reference ground potential.

7. Semiconductor memory apparatus comprising:

a plurality of memory cells, each of which comprises a junction NPN transistor having an uncontacted base, the potential of which floats at two different values which represent, respectively, the storage of a "1" and "0" in the cell;

a first circuit means coupled to a preselected transistor cell for for first decreasing the potential of the collector of said transistor from an initial value to a value that causes the collector-base junction to be forward-biased and the base potential to start to decrease in potential toward a potential greater than that necessary to bias the emitter-base junction to avalanche breakdown, thereby causing the emitter-base junction to operate in avalanche breakdown and preventing the base potential from decreasing further, and then increasing the potential of the collector to its initial value, whereupon the base potential assumes a different potential than the "0" potential, said different potential being the "1" potential;

a second circuit means coupled to the collector of a preselected transistor memory cell for first increasing the collector potential from an initial value to a value to a value sufficient to cause transient transistor conduction only if a "1" is stored in the cell, and then decreasing the potential of the collector to its initial value, whereby the base potential assumes the "0" potential; and a third means forming a plurality of conduction paths coupling said memory cells to said first and second means.

8. The apparatus of claim 7 wherein said first and second circuit means constitute part of a voltage pulse circuit adapted to supply voltage pulses of different amplitudes and polarities.

9. The semiconductor memory apparatus of claim 6 further comprising conduction detector circuits and wherein the plurality of conduction paths which couple the memory cells to the first and second means also couple the memory cells to the conduction detection circuits.

10. The apparatus of claim 9 wherein the conduction detector circuits are low impedances coupling said emitters to said reference ground potential.

11. The apparatus of claim 10 wherein said conduction detector circuits are low impedances coupling said emitters to said reference ground potential.

12. The apparatus of claim 11 further comprising electrically activated switches which couple said conduction detection circuits to said emitters, whereby a "1" and "0" can be stored in or read out of any preselected memory cell without destroying the information stored in any of the other memory cells of said semiconductor memory apparatus.

13. Semiconductor memory apparatus comprising:

a plurality of memory cells, each of which comprises a PNP junction transistor having an uncontacted base, the potential of which floats at two different values which represent, respectively, the storage of a "1" and "0" in the cell;

a first circuit means coupled to a preselected transistor cell for first increasing the potential of the collector of said transistor from an initial value to a value that causes the collector-base junction to be forward-biased and the base potential to start to increase in potential toward a potential greater than that necessary to bias the emitter-base junction to avalanche breakdown, thereby causing the emitter-base junction to operate in avalanche breakdown and preventing the base potential from increasing further, and then decreasing the potential of the collector to its initial value, whereupon the base potential assumes a different potential than the "0" potential, said different potential being the "1" potential;

a second circuit means coupled to the collector of a preselected transistor memory cell for first decreasing the collector potential from an initial value to a value sufficient to cause transient transistor conduction only if a "1" is stored in the cell, and then increasing the potential of the collector to its initial value, whereby the base potential assumes the "0" potential; and a third means forming a plurality of conduction paths coupling said memory cells to said first and second means.

14. A method for performing a memory function utilizing at least one memory cell which comprises a junction transistor having an uncontacted base, the potential of which floats at two values which represent, respectively, a "1" and a "0" stored in the cell comprising the steps of:

writing a "1" into the memory cell by forward biasing the collector-base junction and biasing the emitter-base junction to avalanche breakdown such that the base is set to a first potential defined as a "1;" and reading out information stored in the cell by increasing the potential of the collector sufficiently to cause conduction in the transistor if a "1" is stored in the cell and then decreasing the potential of the collector such that the base is set to a second potential defined as a "0."

* * * * *

UNITED STATES PATENT OFFICE

CERTIFICATE OF CORRECTION

Patent No. 3,699,541 Dated October 17, 1972

Inventor(s) Dennis J. Lynes-Jerry Mar

It is certified that error appears in the above-identified patent and that said Letters Patent are hereby corrected as shown below:

Claim 2, Column 8, line 14, after "collector" insert --for--.

Claim 7, Column 8, line 60, delete "to a value", second occurrence.

Claim 10, Column 9, line 12, after the word "are" delete "low impedances coupling said",
line 13, delete "emitters to said" and insert --coupled to a--.

Signed and sealed this 6th day of March 1973.

(SEAL)
Attest:

EDWARD M.FLETCHER,JR.
Attesting Officer

ROBERT GOTTSCHALK
Commissioner of Patents